(12) United States Patent
Byers

(10) Patent No.: US 7,334,249 B1
(45) Date of Patent: Feb. 19, 2008

(54) METHOD AND APPARATUS FOR DYNAMICALLY ALTERING DIGITAL VIDEO IMAGES

(75) Inventor: Charles Calvin Byers, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/560,245

(22) Filed: Apr. 26, 2000

(51) Int. Cl.
*H04N 7/10* (2006.01)
*H04N 7/025* (2006.01)

(52) U.S. Cl. .......................................... 725/35; 725/34
(58) Field of Classification Search ............. 725/32–36
See application file for complete search history.

(56) References Cited

U.S. PATENT DOCUMENTS 5,758,257 A * 5/1998 Herz et al. .................. 725/116
6,357,042 B2 * 3/2002 Srinivasan et al. ........... 725/32
6,553,178 B2 * 4/2003 Abecassis ..................... 386/83
6,684,194 B1 * 1/2004 Eldering et al. .............. 705/10

* cited by examiner

*Primary Examiner*—Hunter B. Lonsberry
(74) *Attorney, Agent, or Firm*—John B. MacIntyre

(57) ABSTRACT

The present invention provides a method and apparatus for dynamically altering a portion of a digital video image based upon a user profile. A source, such as a network feed or video server, sends a digital video image to a broadband network. The broadband network includes a multicast router, a service node, and a broadband access network. The multicast router receives the digital video image and sends it to a video processor. The video processor can be located in the service node or in a subscriber terminal connected to the broadband network. The video processor retrieves a profile associated with a user. The profile includes information pertaining to a desired characteristic relating to the first user. The video processor digitally alters a portion of the digital video image with a replacement digital image based upon the desired characteristic to produce a dynamically altered video image.

28 Claims, 5 Drawing Sheets

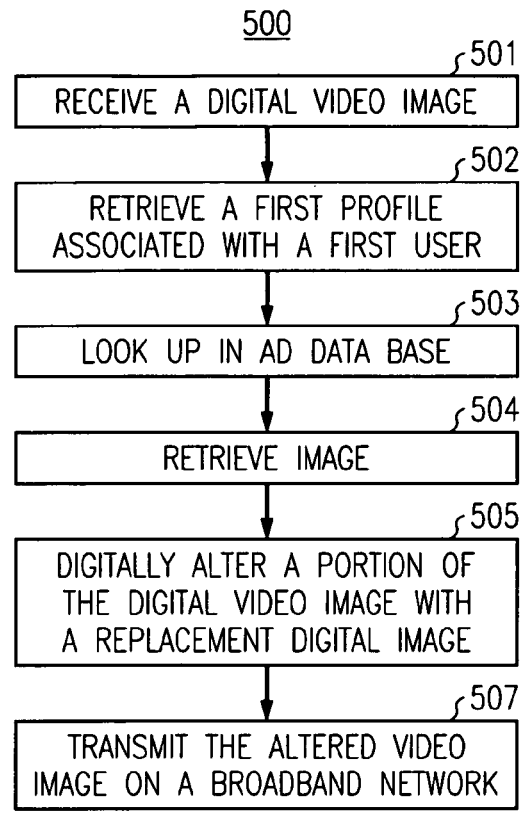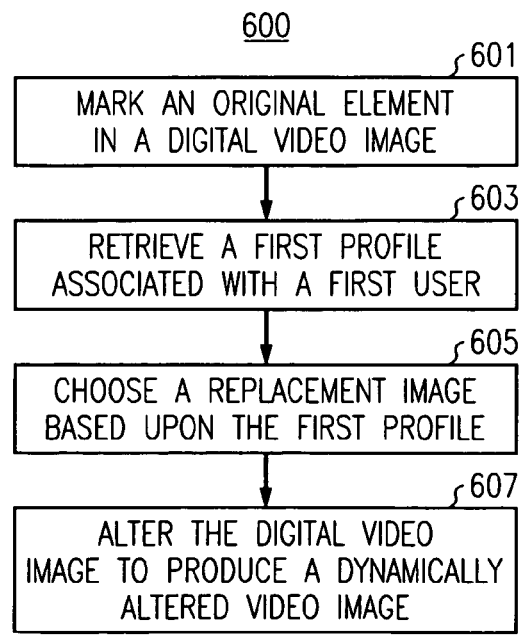

701 RECEIVE A DIGITAL VIDEO STREAM INCLUDING AN ORIGINAL ELEMENT

703 DETERMINE A REPLACEMENT IMAGE TO BE INSERTED INTO THE DIGITAL VIDEO STREAM

705 RETRIEVE THE REPLACEMENT IMAGE

707 REPLACE THE ORIGINAL ELEMENT WITH THE REPLACEMENT IMAGE TO FORM A MODIFIED VIDEO STREAM

709 TRANSMIT THE MODIFIED VIDEO STREAM OVER A BROADBAND NETWORK

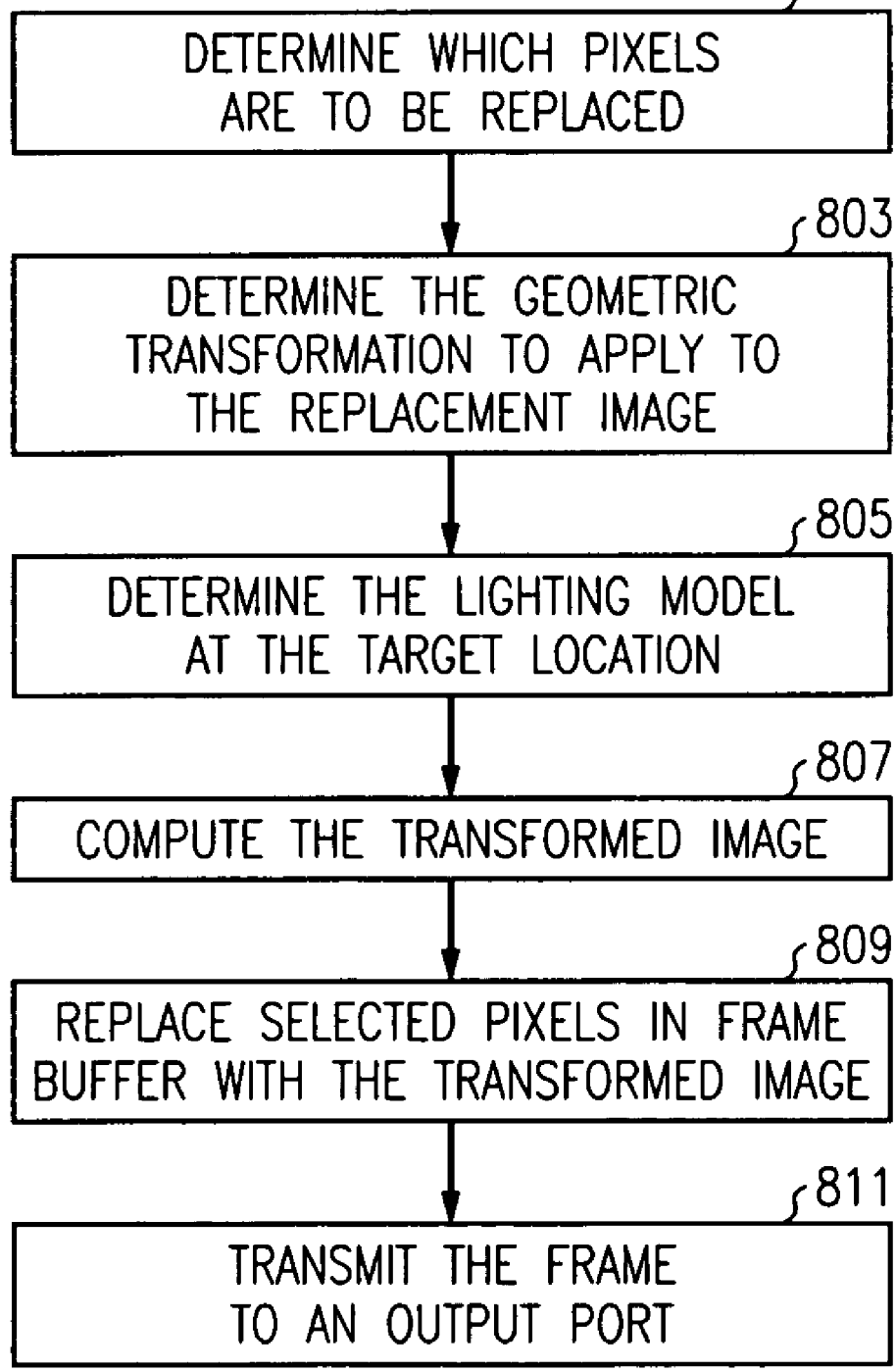

METHOD AND APPARATUS FOR DYNAMICALLY ALTERING DIGITAL VIDEO IMAGES

FIELD OF THE INVENTION

The present invention relates generally to the transmission of digital video images, and more particularly to a method and apparatus for dynamically altering digital video images.

BACKGROUND OF THE INVENTION

Video distribution networks have been set up to distribute video images. Such video networks typically retrieve a program, such as a movie or television show, from a program source, such as a television or movie database. The video server then transmits this video stream over a network.

In certain situations, the video server can retrieve a video image from the program source that has been altered from its original form. One instance of this occurs when a video server hides the face of someone who desires not to be shown on the television screen by digitizing and scrambling the image of the person's face. A second example is digital billboards, where a digital billboard is inserted in the image prior to being stored in the image database. The video server retrieves this stored video image and distributes this video stream to all users on the network.

In both of these scenarios, the video stream is altered prior to storage. The video server then transmits the video stream, without further changes, to recipients of the video image. In current video distribution systems, all users of the system receive identical video images.

One problem with current video distribution systems is that a single video stream is sent across the network to all users of the network. Consequently, all users see the same video stream. There is currently no way to customize the video stream for users, either based upon individual characteristics relating to the user or group characteristics.

Therefore, a need exists for a method and apparatus for dynamically altering digital video images to allow customization of a digital video stream based upon characteristics associated with a user.

SUMMARY OF THE INVENTION

It is an object of the present invention to provide a method and apparatus for dynamically altering digital video images.

The method and apparatus of the present invention dynamically alters a portion of a digital video image based upon a user profile. The user profile can include information pertaining to a desired characteristic of the user. Such characteristics include, but are not limited to, demographic information, time of day information, advertising information, geographic information, and parental consent information. A feature of the present invention is that each subscriber may receive a different altered image, with the alteration being based upon a characteristic of the subscriber.

The preferred embodiment of the present invention performs the alteration of the input video stream at a service node located in a broadband network. In the preferred embodiment, the broadband network includes the service node, a multicast router, and a broadband access network. The service node includes an input port, a control port, one output port for each subscriber terminal connected to the broadband network, a main processor, and a video processor. The video processor includes a digital signal processor (DSP), a control processor, and memory, such as a frame buffer or the like.

The service node receives a digital video stream on the input port from a network feed or a video sever. The digital video stream is passed to the video processor. The video processor determines the product or replacement images to be inserted into the digital video stream. The video processor makes this determination based at least in part upon a customer profile that the service node retrieves from a customer database utilizing the control port. The control processor in the service node retrieves the replacement images from an image database coupled to the service node. The images are preferably stored in the memory, such as a frame buffer. The DSP is effective in replacing the original elements in the input digital video stream with the replacement images to form a modified video stream.

The modified video stream is transmitted over an output port to a broadband access network, which in turn transmits the modified video stream to a subscriber terminal coupled to the broadband network. In the preferred embodiment, the subscriber terminal is connected to a television or the like, which displays or stores the modified video stream.

In an alternate embodiment of the present invention, the altering of the input digital video stream is performed at the subscriber terminal. In this embodiment, an input digital video stream is transmitted from a network feed or video server to a broadband network including a multicast router, a service node, and a broadband access network. The input video stream is passed from the broadband network to the subscriber terminal.

In accordance with the alternate embodiment, the subscriber terminal includes an input port for receiving the original digital video stream, and output port for transmitting the modified video stream to a television or the like, and a video processor. The video processor includes a DSP, a control processor, and memory, and performs the same functionality as the video processor located in the service node in the preferred embodiment, with the control decisions still performed in the network.

Utilizing the alternate embodiment, the image manipulation that is accomplished at the broadband network for each output port, which corresponds to each subscriber terminal connected to the broadband network, has been moved to the subscriber terminal. The selection of the replacement image is preferably accomplished in the broadband network.

The present invention can be utilized for multiple desirable purposes. For instance, targeted product placement can be accomplished in video streams. Product placement refers to placing products into scenes from a play, television show, or movie. Such placement can lead to a boon in sales and publicity for the products so advertised. For example, if a leading character in a television show or movie is shown drinking a particular beverage, sales of that beverage can soar based upon the link to that actor and that show or movie.

Companies spend large budgets in getting their products placed in movies or television shows. One problem with product placement is that the placement is not tailored for an individual user. For example, if a patron watching a movie only drinks diet soft drinks, then a product placement of a non-diet soft drink would have little or no effect on the purchasing of that consumer. Utilizing the present invention alleviates this problem by facilitating the placement of replacement images that are related to a user profile, thereby linking the products inserted into the video stream with a user of the video stream.

A replacement image for a product, such as a product that an actor is using in a movie or television show, can be altered for each desired user based upon factors associated with the intended recipient of the video stream. Such alterations can be based upon user preferences that the user has entered, upon historical viewing preferences or buying patterns of the user, upon demographic information associated with the user, upon geographic information associated with the user, upon the time of day, or upon the parental consent of the user.

Thus, the present invention provides an improved method and apparatus for providing custom-tailored video streams by digitally altering portions of incoming video streams.

BRIEF DESCRIPTION OF THE DRAWINGS

FIG. 5 depicts a flowchart of a method for dynamically altering a portion of a digital video image based upon a user profile in accordance with the preferred embodiment of the present invention.

FIG. 6 depicts a flowchart of a method for dynamically altering a digital video image in accordance with an alternate embodiment of the present invention.

FIG. 7 depicts a flowchart of a method for providing targeted product placement in a digital video stream in accordance with an alternate embodiment of the present invention.

FIG. 8 depicts a flowchart of a preferred method for digitally altering a portion of a product image in accordance with the preferred embodiment of the present invention.

DESCRIPTION OF THE PREFERRED EMBODIMENT(S)

Figure 1:
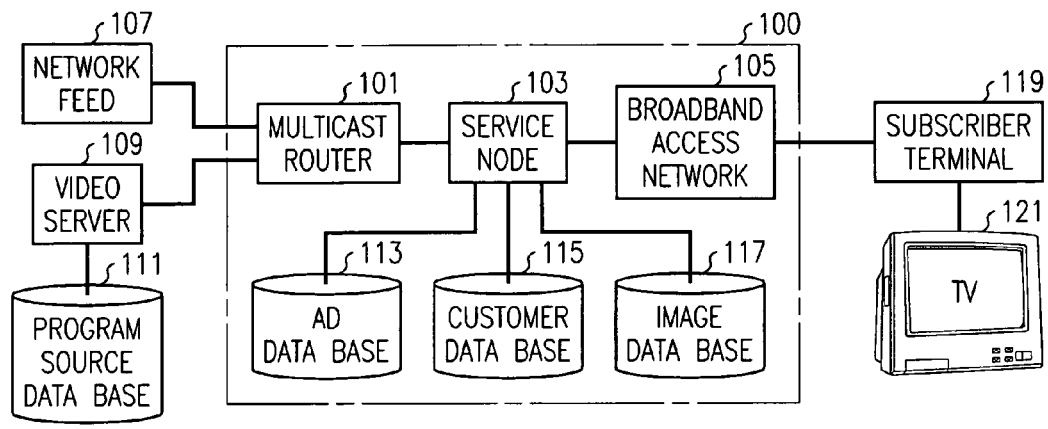
FIG. 1 depicts a broadband network for processing video streams including a multicast router, a service node, and a broadband access network in accordance with the preferred embodiment of the present invention.

FIG. 1 depicts a broadband network 100 for processing video streams in accordance with the preferred embodiment of the present invention. Broadband network 100 comprises a multicast router 101, a service node 103, and a broadband access network 105.

Multicast router 101 is effective in receiving a digital video stream. The digital video stream can be sent from a network feed 107, such as a broadcast network (ABC, NBC, etc.) or a cable network (Home Box Office, Showtime, The Learning Channel, etc.). The digital video stream can also come from a video server 109, such as a database that stores pre-recorded programs such as movies or the like. Video server 109 accesses program source database 111 to retrieve a predetermined program and transmits the digital video stream to multicast router 101.

Multicast router 101 selects one video stream from a plurality of source streams for each viewer connected to broadband access network 105.

Multicast router 101 then sends the digital video stream to service node 103. In the preferred embodiment of the present invention, service node 103 receives the digital video stream, determines a replacement image to insert in the digital video stream, performs target geometry transforming and lighting model, digitally alters the digital video stream by inserting the replacement image, and transmits the altered video image to broadband access network 105.

Figure 2:
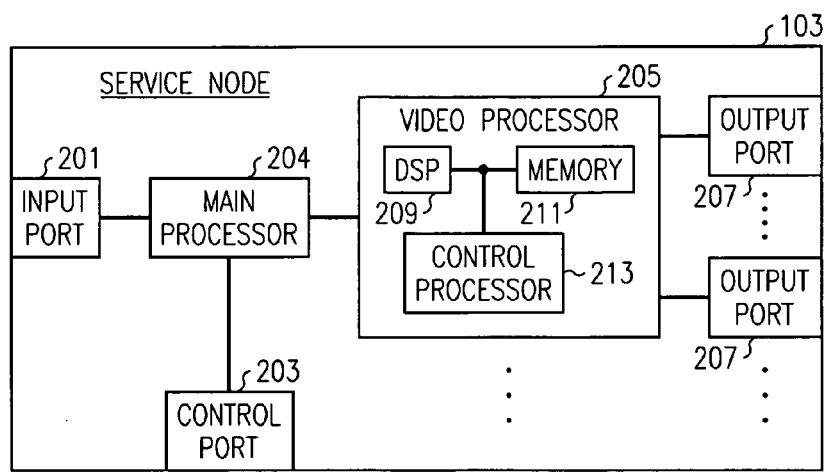
FIG. 2 depicts the service node of FIG. 1 in accordance with the preferred embodiment of the present invention.

FIG. 2 depicts service node 103 in accordance with the preferred embodiment of the present invention. Service node 103 preferably includes an input port 201, a control port 203, a main processor 204, a video processor 205, and at least one output port 207.

Input port 201 is effective in receiving the digital video stream from network feed 107 or video server 109 through multicast router 101.

Control port 203 is effective in accessing an advertiser database 113, a customer database 115, and an image database 117. The replacement images that are to be inserted into the input video stream are stored in image database 117 in digital form.

Advertiser database 113 includes advertising information that relates to advertisers. Such information is preferably organized to allow the retrieval of digital images from image database 117 that can be inserted into the digital video stream. For example, advertiser database can include information relating to thresholds that advertisers are willing to utilize. For example, an advertiser may wish to advertise only if the advertising rate is below a certain amount. This amount can be stored in advertiser database 113. Alternately, as advertiser may only want to advertise if the number of viewers exceeds a certain amount, and this threshold amount can also be stored in advertiser database 113.

Customer database 115 preferably includes a first profile associated with a first user. The first profile preferably includes information pertaining to a desired characteristic relating to the first user. In the preferred embodiment, the profile includes demographic information related to the user. For instance, the profile can include information pertaining to the user, such as their buying preferences, their location, their economic level, or their preference related to any sort of good, such as consumer goods.

As an example of one embodiment of the present invention, the profile may include information that this user prefers a particular type of beverage. The system and method of the present invention could then retrieve this profile, determine the preferred type of beverage that this person prefers, and insert a product image from image database 117 into the input digital video stream in accordance with this preference.

Customer database 115 can all include a profile that includes demographic information. In this embodiment, the information can include information about the demographics of the user. For example, the profile could include the income level of the user, information about the area in which the user lives, the age of the user, the family status of the user, the number of children he or she has, or any other demographic information that would be useful in determining an effective product image to be inserted in the video stream. An appropriate replacement image would then be retrieved from image database 117 based upon the profile including demographic information.

Customer database 115 can include a profile that includes time of day information. In this embodiment, the replacement image can be selected based upon the time of day. For example, if the video stream is being sent out during the daytime hours, a first image, such as one of a soda can, could be retrieved from image database 117 and inserted into the input video stream. If the video stream is being transmitted late at night, a second image, such as one of a beer can, could be retrieved from image database 117 and inserted into the input video stream. In this manner, the output video stream can be tailored to allow the resultant digital video stream to include appropriate images for the intended recipient of the video stream.

Customer database 115 can all include a profile that includes parental consent information. In this embodiment, the replacement image can be selected based upon the parental consent information. For example, the input video stream can include a predefined area that is to be replaced by a replacement video image. This could be a billboard in the background of the input video stream. In this embodiment, there could be multiple choices for what image should be placed onto the background billboard for display in the video stream. The image chosen to be "placed" onto the billboard could be chosen based upon parental consent information.

For example, if the original image on the billboard was one for cigarettes, the system could check the parental consent information, determine that images of cigarettes are not something that is desired to be received at the user's premises, and a replacement image could be retried from image database 117 and replace the original image of the cigarettes. This embodiment gives parents an increased ability to control the images that are entering their household. This parental consent information could be selected based upon the presence and proper configuration of a "V-Chip" in the television that the image is intended for. Examples of image alterations include adding clothing to actors, adding smoke to crash scenes in movies, and any other alterations that would be desirable.

Customer database 115 can also include a profile that includes geographic information. In this embodiment, the replacement image can be one based on the geographic location of the user. For example, the input video stream could include a store location in its image. The store location in the original image may be a store that is only located in certain regions of the country. If this is the case, it may be desirable to replace that store with another that is located in the area that the user is located. In this embodiment, a replacement image that is associated with the geographic location of the user can be retrieved from image database 117 and inserted into the input digital video stream to make the video stream of more interest to that user.

Video processor 205 preferably performs the processing necessary to insert the replacement digital image into the original video stream. Video processor 205 preferably includes a digital signal processor (DSP) 209, memory 211, and a control processor 213. Control processor 213 is effective in determining the product images to be inserted, and preferably makes this determination based at least in part upon a customer profile retrieved from customer database 115, as described above. Control processor 213 is also effective in retrieving replacement images from image database 117 and storing the replacement images in memory 211.

DSP 209 is effective in replacing the original elements with the replacement images to form a modified video stream. DSP 209 preferably decompresses the original image, which was preferably received in a compressed format. DSP 209 preferably accomplishes the replacement of the original element by calculating the geometry of the replacement image, determining the lighting present in the original image, determining the transparency of the replacement area in the original image, determining the object order and motion, and overwriting selected portions of the frame buffer that include the original video image. DSP 209 then preferably compresses the resultant modified image.

Memory 211 is preferably a frame buffer, but can alternately be any type of storage medium that is capable of storing digital images.

Main processor 204 preferably controls the operation of video processor 205. Main processor 204 preferably accomplishes this by utilizing database lookups, performing algorithms, and performing command message creation on advertising database 113, customer database 115, and image database 117. Main processor 204 loads the parameters into video processor 205, manages the bandwidth, and manages the connections.

Service node 103 preferably includes multiple output ports 207, as depicted in FIG. 2. Each output port 207 is effective in transmitting a modified video stream to subscriber terminal 119. In the preferred embodiment of the present invention, service node 103 includes one virtual output port for each video processor included in the service node 103. This virtual output port can be muxed onto a smaller number of high-speed facilities.

Returning now to FIG. 1, broadband access network 105 is effective in receiving the altered video stream from service node 103. In the preferred embodiment of the present invention, broadband access network 105 is effective in transmitting the altered video stream preferably to subscriber terminal 119, which in turn transmits the image to television 109 or the like for display or storage. As an example, broadband access network 105 can be xDSL ("x" Digital Subscriber Line), broadband wireless, or any other broadband network capable of carrying video streams.

Figure 3:
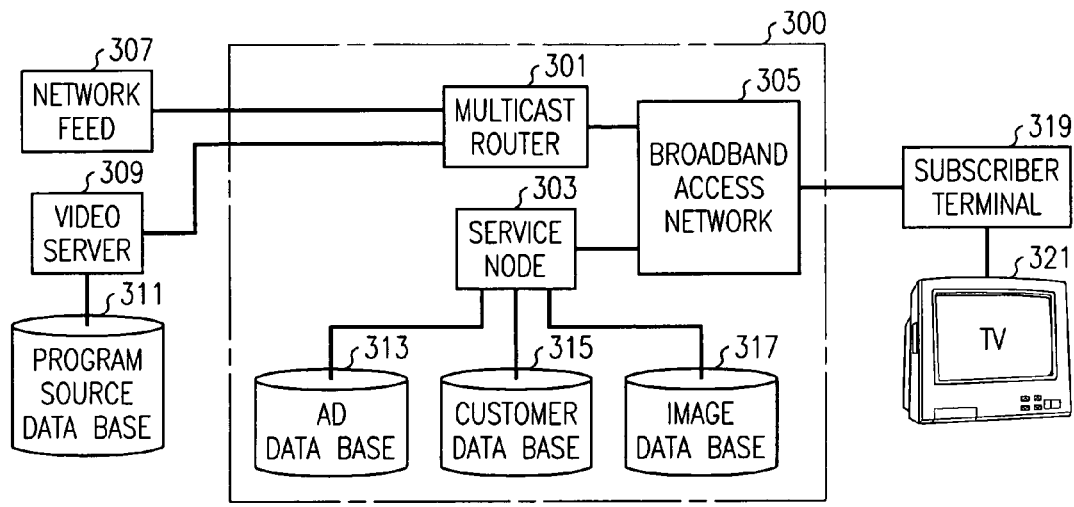
FIG. 3 depicts a broadband network for processing video streams including a multicast router, a service node, and a broadband access network in accordance with an alternate embodiment of the present invention.

FIG. 3 depicts a broadband network 300 for processing video streams in accordance with an alternate embodiment of the present invention. In accordance with the alternate embodiment depicted in FIG. 3, the functionality performed by video processor 205 in accordance with the preferred embodiment of FIGS. 1 and 2 is moved to subscriber terminal 319.

Broadband network 300 includes a multicast router 301, a service node 303, and a broadband access network 305. Multicast router 301 and broadband access network 305 perform substantially the same functionality as multicast router 101 and broadband access network 105, respectively, as described with regard to FIGS. 1 and 2. Service node 303 reads advertiser database 313, customer database 315, and image database 317. Service node 303 also assembles a command message, preferably including geometry, source image, and lighting, and transmits the command message to subscriber terminal 319 for rendering.

Figure 4:
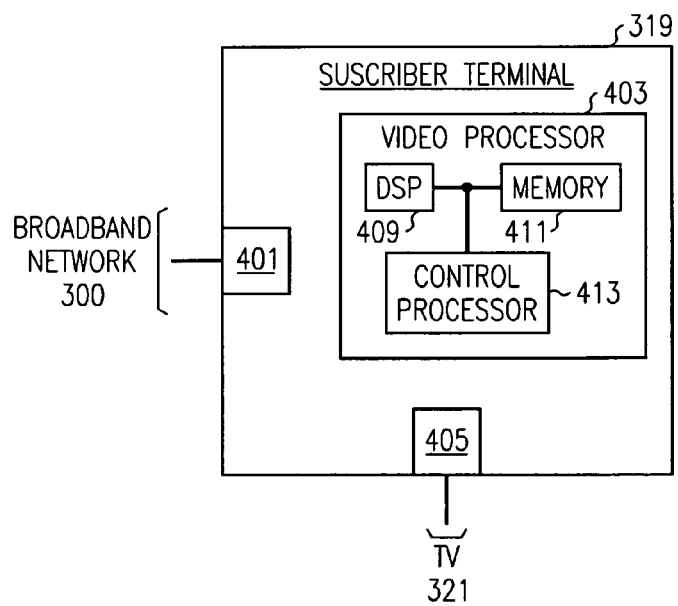
FIG. 4 depicts a subscriber terminal in accordance with an alternate embodiment of the present invention.

FIG. 4 depicts a subscriber terminal 319 in accordance with the alternate embodiment of the present invention. In accordance with this alternate embodiment, subscriber terminal 319 includes the video manipulation functionality present in service node 103 shown in FIGS. 1 and 2 in the preferred embodiment of the present invention.

Subscriber terminal 319 comprises an input port 401, a video processor 403, and an output port 405. Subscriber terminal 319 includes a relatively small control processor for simple control of functions thereon. Service node 303 preferably includes a main processor that is effective in controlling the operation of video processor 403.

Input port 401 is effective in receiving a digital video stream, preferably from broadband network 300.

Output port 405 is effective in transmitting a modified video stream to an output device, such as television 321 or the like. The output device can alternately be a video monitor, a video display device, a computer, a storage medium for storage of the modified video signal, or any other device that is capable of storing, forwarding, or displaying the video stream.

Video processor 403 comprises a digital signal processor (DSP) 409, memory 411, and a control processor 413. Video processor 403 preferably performs the processing necessary to insert the replacement digital image into the original video stream. Service node 303 is effective in retrieving replacement images from image database 317 and transmitting the replacement images to video processor 403. DSP 409 is effective in replacing the original elements with the replacement images to form a modified video stream. Memory 411 is preferably a frame buffer, but can alternately be an type of storage medium that is capable of storing digital images.

Service node 303 is effective in determining the product images to be inserted. This determination is preferably based at least in part upon a customer profile that is retrieved from the customer database. DSP 409 is effective in replacing the original elements in the input video stream with replacement images retrieved from an image database to form a modified video stream. The replacement images that are to be inserted into the input video stream are stored in image database 317 in digital form. The modified video stream is transmitted over output port 405 to a display device 321 or the like.

The customer database of this alternate embodiment functions in substantially the same manner as the customer database described in FIGS. 1 and 2 above.

FIG. 5 depicts a flowchart 500 of a preferred method for dynamically altering a portion of a digital video image based upon a user profile. Although the embodiment described below describes the processing occurring in the service node of the broadband network as in the preferred embodiment, the same processing can occur in the subscriber terminal or other computing devices as described in the alternate embodiment described in FIGS. 3 and 4 above.

A service node receives (501) a digital video image. The digital video image is preferably a digital video stream that is received from a source such as a video network or the like.

The service node retrieves (502) a first profile associated with a first user. The first profile preferably includes information pertaining to a desired characteristic relating to the first user. The first profile includes information associated with the first user. For instance, the first profile can comprise information pertaining to a user receiving the altered video image. This can be demographic information, time of day information, advertising information, geographic information, or parental consent information. This information is preferably retrieved from a customer database.

The service node then looks up (503) the first profile in the ad database. The ad database will include information pertaining to the first user, such as demographic information, purchasing information, or related information. The service node determines from the ad database the image to be retrieved from the image database.

The service node then retrieves (504) an image from the image database. This retrieval is based upon the information obtained from the ad database. The image is stored in digital form and can be utilized to overlay and replace the original image in the original video stream.

The service node digitally alters (505) a portion of the digital video image with a replacement digital image. This alteration is preferably based upon the desired characteristic and produces a dynamically altered video image. The replacement image is preferably retrieved from an image database.

FIG. 8 depicts a flowchart 505 of a preferred method for digitally altering a portion of a product image in accordance with the preferred embodiment of the present invention. In the preferred embodiment of the present invention, the service node decompresses the image prior to digitally altering the image.

The service node determines (801) which pixels in the frame buffer are to be replaced. This is preferably done using keying techniques or out-of-band geometry using a list of polygons. The service preferably also sends the time code and the program identification to the control processor.

The service node determines (803) the geometric transformation to apply to the replacement image. Most replacement images are stored as two-dimensional images. The service node applies geometric transformation to make the replacement image appear more realistic and more three-dimensional. This is done by translating the replacement image, rotation of the replacement image, scaling of the replacement image, and determining the camera perspective relating to the image to be replaced.

The service node determines (805) a lighting model at the target location, which is the location in the image where the replacement image will appear. This is preferably done by determining the source, location, brightness, color, and diffusion relating to the lighting at the target location in the original video stream.

The service node computes (807) the transformed image based on the geometric and lighting transformations determined in previous steps.

The service node then replaces (809) selected pixels in the frame buffer with the elements of the transformed image that show through in the video stream. The selected pixels will be located within the target location. The system must be able to determine if the replacement image should be behind another image in the original stream. If so, the service node should not replace the pixels at these locations, as they would not be showing in real life if they were behind another image in the scene.

The service node then transmits (811) the modified frame to an output port, and the modified image will eventually be sent to a subscriber terminal. In the preferred embodiment of the present invention, the service node compresses the modified image prior to transmitting the modified image.

The process of steps 801-811 preferably occurs for each frame in the video stream, and will be repeated until the video streams is exhausted or a command is received to cease the replacement of images in the video stream.

Returning now to FIG. 5, the service node transmits (507) the altered video image, preferably on a broadband network. In the alternate embodiment, the subscriber terminal would transmit the altered video stream to a television or the like for display or storage of the modified video stream.

FIG. 6 depicts a flowchart 600 of an alternate method for dynamically altering a digital video image. In the alternate embodiment depicted in FIG. 6, the processing is occurring in a service node as depicted in FIGS. 1 and 2. Alternately, the processing can be occurring in a subscriber terminal as depicted in FIGS. 3 and 4 above.

FIG. 6 depicts an embodiment of the present invention that is effective in marking an image for digital billboard or product placement purposes. In accordance with this embodiment of the present invention, a computing device marks (601) an original element in a digital video image. The original element includes a portion of the digital video image. Such original element can be a billboard, storefront, object, or any other part of the digital image. This can be accomplished using keying techniques, fiducials, or a set survey linked to camera moves and lens settings.

The service node retrieves (603) a first profile associated with a first user. The first profile includes information pertaining to a desired characteristic relating to the first user.

The service node chooses (605) a replacement image based at least in part upon the first profile. The replacement image can be selected based upon various criteria. One method of choosing a replacement image comprises choosing a replacement image based upon a user profile. The replacement image can be chosen based upon demographic information, the time of day, a parental rating code, advertising information, or geographic information.

The service node alters (607) the digital video image by replacing the original element with the replacement image to produce a dynamically altered video image, in a similar manner as described above with reference to FIG. 8. The dynamically altered video image is then preferably transmitted to a device that is effective in displaying or storing the video image.

FIG. 7 depicts a flowchart 700 of a preferred method for providing targeted product placement in a digital video stream. The embodiment depicted in FIG. 7 is a method for replacing an original element in a digital video stream with a replacement image. The method depicted in FIG. 7 is preferably accomplished in a service node as shown in FIGS. 1 and 2, but can alternately be accomplished in a subscriber terminal or the like as depicted in FIGS. 3 and 4.

The service node receives (701) a digital video stream that includes an original element. The original element preferably comprises a portion of the digital video stream. The original element is preferably defined by fiducials. As used herein, the term fiducial refers to reference points that are used to mark a discrete element. For example, the fiducials can be points on the corners of an object. The fiducials can also be defined by pixel locations in the image. The fiducials can alternately be a specific color. For instance, a background billboard in a digital video image can be a specific color, such as green. This shade of green can be used as a fiducial to indicate that the green area of the billboard is to later be replaced by a replacement image. An alternate way of providing fiducials can be to utilize gray hemispheres on each corner of the target location, where the hemispheres have a predetermined color shading, such as 50% gray.

The service node determines (703) a replacement image that should be inserted into the digital video stream. This determination is preferably based at least in part upon a user profile. The user profile includes information associated with a user, such as demographic information, time of day information, advertising information, geographic information, or parental consent information.

The service node retrieves (705) the replacement image from an image database and replaces (707) the original element with the replacement image to form a modified video stream. This is accomplished in a similar manner as is described with regard to FIG. 8 above.

The service node transmits (709) the modified video stream over a broadband network to a device capable of displaying or storing the modified video stream.

Thus, the present invention provides a method and apparatus that solves a problem associated with the prior art. The present invention provides a method and apparatus for dynamically altering a digital video image. By altering the video stream based upon a user profile associated with a user, a modified video stream can be provided that is tailored to the user.

The present invention can be used in numerous ways. These include, but are not limited to, targeted product placement, target advertising, parental screening of appropriate images to be received, dynamic advertising based upon advertising rates or number of subscribers, dynamic advertising based upon factors such as demographics or geographic location, and numerous other applications in which the modifications of a portion of a video stream is desired.

While this invention has been described in terms of certain examples thereof, it is not intended that it be limited to the above description, but rather only to the extent set forth in the claims that follow.

I claim:

1. A method for dynamically altering a digital video image, the method comprising the steps of:
    marking an original element in a digital video image, the original element comprising a portion of the digital video image and defined by fiducials comprising gray hemispheres located in the digital video stream;
    retrieving a first profile associated with a first user, the first profile including time of day information relating to the first user;
    choosing a replacement image based at least in part upon the first profile and a parental rating code; and
    altering the digital video image by replacing the original element with the replacement image to produce a dynamically altered video image.

2. A method for dynamically altering a digital video image in accordance with claim 1, wherein the step of choosing a replacement image comprises choosing a replacement image based upon the first profile.

3. A method for dynamically altering a digital video image in accordance with claim 1, wherein the step of choosing a replacement image comprises choosing a replacement image based upon demographic information.

4. A method for dynamically altering a digital video image in accordance with claim 1, wherein the step of choosing a replacement image comprises choosing a replacement image based upon advertising information.

5. A method for dynamically altering a digital video image in accordance with claim 1, wherein the step of choosing a replacement image comprises choosing a replacement image based upon geographic information.

6. A method for providing targeted product placement in a digital video stream, the method comprising the steps of:
    receiving a digital video stream that includes an original element, the original element comprising a portion of the digital video stream and is defined by fiducials comprising gray hemispheres located in the digital video stream;
    determining, based at least in part upon parental consent information and a first profile associated with a first user and including time of day information relating to the first user, a replacement image that should be inserted into the digital video stream;
    retrieving the replacement image;
    replacing the original element with the replacement image to form a modified video stream; and
    transmitting the modified video stream over a broadband network.

7. A method for providing targeted product placement in a video stream in accordance with claim 6, wherein the step of determining a replacement image that should be inserted comprises the step of determining the product image that should be inserted based at least in part upon demographic information.

8. A method for providing targeted product placement in a video stream in accordance with claim 6, wherein the step of determining a replacement image that should be inserted comprises the step of determining the product image that should be inserted based at least in part upon advertising information.

9. A method for providing targeted product placement in a video stream in accordance with claim 6, wherein the step of determining a replacement image that should be inserted comprises the step of determining the product image that should be inserted based at least in part upon geographic information.

10. A service node for processing a digital video stream, the service node comprising:
an input port effective in receiving a digital video stream including an original element defined by fiducials comprising gray hemispheres located in the digital video stream;
a control port for accessing a customer database and an image database, wherein the customer database comprises parental consent information;
a video processor including a digital signal processor (DSP), memory, and a control processor, the control processor being effective in determining the product images to be inserted based at least in part upon a customer profile retrieved from the customer database and including time of day information relating to the customer profile, the control processor also effective in retrieving replacement images from the image database, the DSP effective in calculating transforms and selectively overwriting the original element, the DSP also effective in storing the replacement images in the memory, the DSP being effective in replacing the original elements with the replacement images to form a modified video stream; and
an output port effective in transmitting the modified video stream.

11. A service node for processing a digital video stream in accordance with claim 10, wherein the memory is a frame buffer.

12. A service node for processing a digital video stream in accordance with claim 10, further comprising a main processor effective in controlling the operation of the video processor.

13. A service node for processing a digital video stream in accordance with claim 10, wherein the customer database comprises demographic information.

14. A service node for processing a digital video stream in accordance with claim 10, wherein the customer database comprises advertising information.

15. A service node for processing a digital video stream in accordance with claim 10, wherein the customer database comprises geographic information.

16. A broadband network for processing video streams, the broadband network comprising:
a multicast router effective in receiving a digital video stream;
a service node comprising:
an input port effective in receiving the digital video stream;
a control port for accessing a customer database and an image database, wherein the customer database comprises parental consent information;
a video processor including a digital signal processor, memory, and a control processor, the control processor being effective in determining the product images to be inserted based at least in part upon a customer profile retrieved from the customer database, the customer profile including time of day information, the control processor effective in retrieving replacement images from the image database and storing the replacement images in the memory, the digital signal processor being effective in replacing the original elements defined by fiducials comprising gray hemispheres located in the digital video stream with the replacement images to form a modified video stream; and
an output port effective in transmitting the modified video stream over a broadband network; and
a broadband access network effective in transporting the altered video stream.

17. A broadband network for processing video streams in accordance with claim 16, wherein the memory is a frame buffer.

18. A broadband network for processing video streams in accordance with claim 16, further comprising a main processor effective in controlling the operation of the video processor.

19. A broadband network for processing video streams in accordance with claim 16, wherein the customer database comprises demographic information.

20. A broadband network for processing video streams in accordance with claim 16, wherein the customer database comprises advertising information.

21. A broadband network for processing video streams in accordance with claim 16, wherein the customer database comprises geographic information.

22. A subscriber terminal for receiving a digital video stream, the subscriber terminal comprising:
a port for receiving a digital video stream and subscriber data, the subscriber data including replacement images based at least in part upon a customer profile including time of day information aid parental consent information; and
a video processor comprising:
an input port effective in receiving a digital video stream;
a video processor including a digital signal processor, and memory, the digital signal processor being effective in replacing the original elements defined by fiducials comprising gray hemispheres located in the digital video stream with the replacement images to form a modified video signal; and
an output port effective in transmitting the modified video signal.

23. A subscriber terminal for receiving a digital video stream in accordance with claim 22, wherein the memory is a frame buffer.

24. A subscriber terminal for receiving a digital video stream in accordance with claim 22, further comprising a main processor effective in controlling the operation of the video processor.

25. A subscriber terminal for receiving a digital video stream in accordance with claim 22, wherein the customer database comprises demographic information.

26. A subscriber terminal for receiving a digital video stream in accordance with claim 22, wherein the customer database comprises advertising information.

27. A subscriber terminal for receiving a digital video stream in accordance with claim 22, wherein the customer database comprises geographic information.

28. A method for providing a user-tailored video service to a subscriber, the method comprising:
obtaining user information pertaining to a plurality of users;

storing the user information for each of the plurality of users in a customer database;

receiving a video stream, the video stream including an original element comprising a portion of the video stream, the original element defined by fiducials comprising ray hemispheres located in the digital video stream;

retrieving user information associated with a first user, the user information including parental consent information and time of day information relating to the first user;

determining a replacement image to be inserted into the video stream based at least in part upon the user information;

retrieving the replacement image;

replacing the original element with the replacement image to form a modified video stream; and transporting to modified video stream to the first user over a broadband network.

* * * * *